United States Patent [19]

Sano et al.

[11] 3,957,674

[45] May 18, 1976

[54] MAGNESIUM HYDROXIDE SUSPENSION

[75] Inventors: Hiroshi Sano; Nozomu Matsuno; Katsumi Okina, all of Iwaki, Japan

[73] Assignee: Shin Nihon Kagaku Kogyo Kabushiki Kaisha, Osaka, Japan

[22] Filed: Sept. 21, 1973

[21] Appl. No.: 399,604

[30] Foreign Application Priority Data

Oct. 17, 1972 Japan .............................. 47-103258

[52] U.S. Cl. ................................ 252/182; 252/309; 252/313 R; 252/317; 252/363.5; 252/430; 252/475; 302/66; 423/225

[51] Int. Cl.² ....................... B01J 21/10; B01F 3/12

[58] Field of Search ............. 252/313 R, 363.5, 309, 252/317, 182, 430, 475; 302/14, 66; 423/225

[56] References Cited

UNITED STATES PATENTS

| | | | |
|---|---|---|---|
| 2,414,024 | 1/1947 | Cooper | 252/313 R |
| 2,692,239 | 10/1954 | Hunter et al. | 252/313 R |
| 3,509,066 | 4/1970 | Jacobs et al. | 252/313 R |
| 3,717,600 | 2/1973 | Dalhuisen et al. | 252/309 |

FOREIGN PATENTS OR APPLICATIONS 658,428   5/1965   Belgium ........................ 252/313 R

*Primary Examiner*—Benjamin R. Padgett
*Assistant Examiner*—Irwin Gluck
*Attorney, Agent, or Firm*—Cooper, Dunham, Clark, Griffin & Moran

[57] ABSTRACT

Discloses a fluid aqueous suspension of magnesium hydroxide having a solid concentration between about 35 and 60 percent by weight and a viscosity up to 10,000 cp. comprising at least 0.5% by weight of a sodium naphthalenesulfonate surface active agent based on the weight of magnesium hydroxide.

6 Claims, 2 Drawing Figures

FIG. I

MAGNESIUM HYDROXIDE SUSPENSION

BACKGROUND OF THE INVENTION

1. Field of the Invention

This invention relates to aqueous suspensions of magnesium hydroxide. More particularly, it is concerned with suspensions having satisfactory fluidity at a high concentration coupled with low tendency towards sedimentation.

2. Description of the Prior Art

Magnesium hydroxide is widely used in the chemical industries as the starting material for the preparation of magnesium sulfite in the magnefite process, as a neutralizing agent, as a gas absorber and in other utilities. It has recently attracted attention as a sulfurous acid gas absorber in flue gas as well as an additive to boilers using heavy oil for prevention of both high and low temperature corrosion. Magnesium hydroxide is transformed in the form of a slurry, cake or dry powder. A disadvantage of aqueous slurries is that the solid content is 35 percent at the highest. This markedly increases the transportation cost. In addition, there is a high tendency towards sedimentation or separation during the transportation. The form, therefore, is unsuitable for transportation. If the solid content of magnesium hydroxide is increased to over 35 percent the viscosity is 10,000 cp. or higher so that a cake with no fluidity is formed. Although transportation in this form may be possible, the handling of the cake is very inconvenient. Moreover, the reversion of the cake to a slurry, which is necessary for practical uses of magnesium hydroxide, requires a large amount of power and time due to the high viscosity of the cake.

Alternatively, magnesium hydroxide is often transported in dry powder. This is not satisfactory, however, since even if finely pulverized, the particles do not completely recover their original size. Moreover, aggregation of the particles and reduction in the surface activity will result in a higher tendency towards sedimentation and lower reactivity.

It is therefore desirable to transport magnesium hydroxide in slurry form, but with a concentration comparable to the cake, but with good fluidity and decreased sedimentation tendency.

Attempts which have been made by prior art techniques to prepare aqueous suspensions with high concentration of magnesium hydroxide have not been successful. Consequently, means have been adopted to transport magnesium hydroxide in organic oily preparations at a high concentration by the addition of emulsifiers, surface active agents or protective colloid forming materials (cf. Japanese Pat. Publications 9581/63 and 31863/70). In these cases, however, special uses such as for the fuel additive are only possible because of the extender being an organic oily substance. Moreover, these preparations are expensive.

The magnesium hydroxide that is obtained by reacting lightly calcined dolomite with salt water containing magnesium halogenides and calcium chloride as the mother liquor is known to yield fluid aqueous suspensions of high concentration (cf. U.S. Pat. No. 3,451,774). This macrocrystalline magnesium hydroxide prepared by this special method has a lower water content, good fluidity of the suspension, and ready filterability, but readily forms sediment.

Colloidal magnesium hydroxide with low tendency of sedimentation can be produced under specialized reaction conditions, but it is difficult to filter and the solid concentration is low.

SUMMARY OF THE INVENTION

It is an object of this invention to provide a fluid aqueous suspension of magnesium hydroxide having a solid concentration of from 35 to 60 percent by weight and a viscosity of 10,000 cp. or lower by concentrating a magnesium hydroxide obtained by conventional methods and then adding at least 0.5 percent by weight of sodium naphthalene sulfonate surface active agent based on the weight of magnesium hydroxide.

According to the present invention, the addition of a specific surface active agent to a magnesium hydroxide suspension in the concentration range which is normally a cake with no fluidity provides a highly fluid aqueous suspension which is very low in tendency towards sedimentation.

DESCRIPTION OF THE INVENTION

Figure 1:
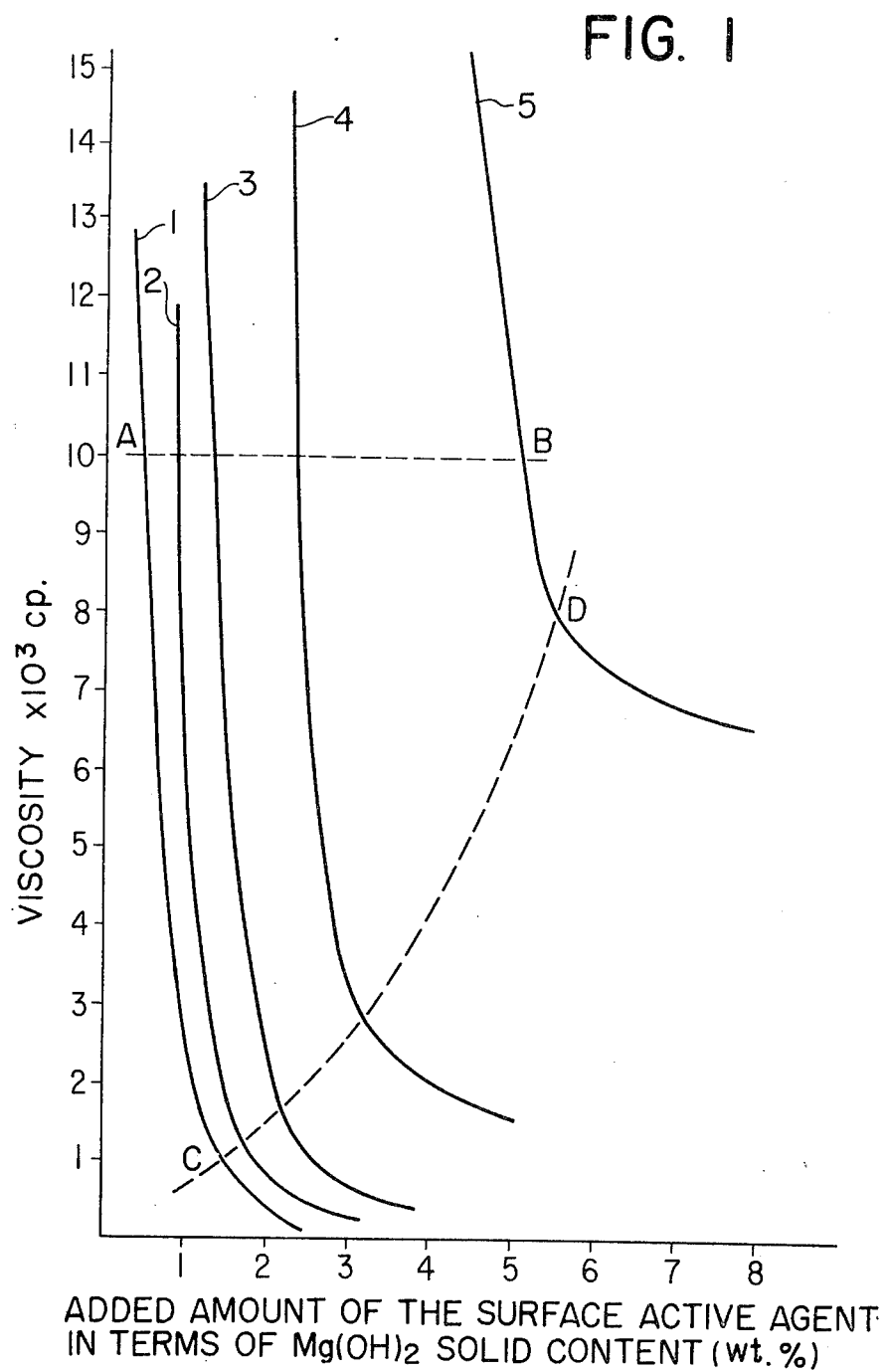
FIG. 1 shows relationship between the ratio of the surface active agent added to the solid content of magnesium hydroxide prepared in the Examples and the viscosity, wherein (1), (2), (3), (4) and (5) indicate the results with 35 percent, 40 percent, 45 percent, 55 percent and 60 percent by weight solid content of magnesium hydroxide respectively.

Magnesium hydroxide used in the invention may be obtained by conventional reactions such as treating sea water or salt water containing magnesium chloride with an alkali, for example, quick lime or lightly calcined dolomite.

Magnesium hydroxide normally remains in a slurry until concentrated to about 35 percent by weight and further concentration is possible by such a means as spontaneous sedimentation, filtration or centrifugal separation. Concentration to a higher degree is also possible by addition of dry powders to the slurry or, in the alternative, by the addition of water to the dry powders.

It has been observed that magnesium hydroxide slurry precipitates through five stages:

First stage. Initial stage is a homogeneous dispersion.

Second stage. Formation of a supernatant layer by sedimentation of particles so as to form a concentration gradient between the upper and lower portions in the dispsersion. It is possible at this stage to attain recovery of the first stage by agitation.

Third stage. Further advancement of supernatant separation and development of precipitate layer. Only with powerful agitation is recovery to the original homogeneous dispersion possible.

Fourth stage. Growth of the precipitate layer with elimination of the intermediate dispersion and final formation of supernatant and precipitate layers. At this stage recovery to the original homogeneous dispersion by agitation is impossible.

Fifth stage. Weight of the precipitate gives rise to compressive dehydration with the formation of a precipitate layer which is even further concentrated.

Concentrated magnesium hydroxide at solid concentrations higher than about 35 percent by weight loses fluidity and forms a cake. This corresponds to the precipitate layer at the fifth stage during the above-described process of sedimentation with the supernatant layer removed. It has now been discovered that mechanical blending of a sodium naphthalene sulfonate surface active agent with the magnesium hydroxide in cake form returns the original fluidity, and recovers the first stage. According to this invention magnesium hydroxide slurries having a solid content of 35 to 60 percent by weight together with about 0.5 percent by weight of more of a sodium naphthalene sulfonate surface active agent based on the solid content of magnesium hydroxide is formed. The slurry has satisfactory fluidity and low tendency towards sedimentation. Sedimentation for the thus formed magnesium hydroxide slurries will proceed on standing only up to the third stage but no further. Slurries with solids content exceeding about 60 percent by weight satisfactory fluidity cannot be formed even by the addition of large amounts of surface active agent.

Typically useful sodium naphthalene sulfonates include sodium alkyl naphthalene sulfonates of formalin condensates of sodium $\beta$-naphthalene sulfonates.

Alkyl groups in the sodium alkyl naphthalene sulfonates may contain three or more carbon atoms as in propyl, isopropyl or butyl groups. Average degree of condensation in the formalin condensates of sodium $\beta$-naphthalene sulfonates may be around 10, and they may be mixtures with a variety of degrees of condensation.

Although sulfonic or carboxylic anionic surface active agents are generally used as stabilizers for aqueous inorganic suspensions, they are not generally effective upon highly concentrated compositions of magnesium hydroxide suspensions. It is surprising therefore to find that sodium naphthalene sulfonates, particularly formalin condensates of sodium $\beta$-naphthalenesulfonate are effective.

FIG. 1 shows relationship between ratio of the surface active agent added to the solid content of magnesium hydroxide on the basis of the results in Example 1. In the figure, (1), (2), (3), (4) and (5) respectively represent the cases where solid content of magnesium hydroxide is 35 percent, 40 percent, 45 percent, 55 percent and 60 percent by weight. The lowest limit of the amount of surface active agent to be added to give the suspension fluidity in terms viscosity of 10,000 cp. is indicated by a straight line connecting A and B in FIG. 1. In fact, the minimum amount to be added at a solid concentration of 35 is 0.5 percent.

When a slurry obtained under conditions defined by the area between the curves 1 and 5 under the straight line AB is allowed to stand for a long period of time, the process of sedimentation as described above may proceed up to the third stage with a smaller amount of the surface active agent added. However, it may be returned to the original slurried state. The economic transportation of such magnesium hydroxide slurries is possible. When the amount of the surface active agent added is further increased within the above-cited area the in viscosity decreases rapidly. Further increase in the amount of the surface active agent added develops an inflection in the curve indicating a decreased rate of reduction in viscosity and completion of the slurry formation. The curve CD connecting the inflection points from about 1 to 6 percent indicates the optimum amounts of the surface active agent to be added. It will be seen that the optimum amount to be added at a solid concentration of 40 is 1.7 percent. Slurries obtained by the addition of a sufficient amount of the surface active agent so as to be defined by the area between the curves 2 and 5 and on the right side of the curve CD, even if allowed to stand for a long period of time, will not proceed to a stage later than the second but have very low tendency toward sedimentation.

Mechanical means for blending the surface active agents are conventional. They include, for example a pestle, kneader, homogenizer, paddle mixer, colloid mill and the like. Choice and combined use of them are optional so long as satisfactory effects of blending can be obtained.

The following nonlimiting examples are given by way of illustration.

EXAMPLE 1

To magnesicum hydroxide cakes respectively at solid concentrations of 35 percent, 40 percent, 45 percent, 55 percent and 60 percent by weight were added predetermined amounts of a formalin condensate of sodium $\beta$-naphthalene sulfonate. The mixtures were agitated in a grinder for 5 minutes and, after the temperature was adjusted to 25°C, measurements of the viscosity were made. The viscosimeter used was an HBT-type rotary viscosimeter manufactured by Brookfield, U.S.A. operated at 50 r.p.m.

The results are shown in FIG. 1. In the figure, (1), (2), (3), (4) and (5) indicate viscosity changes at solid concentrations of magnesium hydroxide of 35 percent, 40 percent, 45 percent, 55 percent and 60 percent by weight, respectively. It will be seen that the addition of formalin condensates with sodium $\beta$-naphthalene sulfonate causes rapid reduction in viscosity. Further increases in the amounts of the surface active agents added causes an inflection point which indicates completion of slurry formation. The dotted line CD represent the bending points at given concentrations of magnesium hydroxide, which indicates the optimum amount of the surface active agent to be added for slurry formation.

EXAMPLE 2

To magnesium hydroxide respectively at solid concentrations of 25, 35, 40, 45, 55 and 60 percent by weight was added formalin condensate of sodium $\beta$-naphthalenesulfonate and the mixtures were agitated in a pestler for 5 minutes. The resulting slurries were each placed in a beaker 15 cm. in diameter to a height of 20 cm. from the bottom, and then allowed to stand in an thermostatic water tank at 25°C. In order to make comparisons of the suspension stability with reference to the solid concentration of magnesium hydroxide the slurries were sampled from the upper (2 cm. below the liquid surface), medium (10 cm. below the liquid surface) and lower (18 cm. below the liquid surface) portions after one, three and seven days of standing and measurements were made on the solid concentration. Viscosities were also measured after 7 days in the upper, medium and lower portions. The results are shown in Table 1. The composition with a solid concentration of 35 percent by weight with no surface active agent added was in the form of a cake, which had a viscosity of 30,500 cp. The suspensions at 40, 45, 55 and 60 percent by weight developed almost no concentration difference even after 7 days with high fluidity, whereas those at 35 and 25 percent by weight developed concentration gradients, the former being sedimented to the third stage described above and the latter to the fourth or fifth stage.

hydroxide was diluted with ion-exchange water to a concentration of 0.2 percent by weight, followed by Table 1

| Solid concentration of magnesium hydroxide | Added amount of surface active agent | Measured portion | Solid concentration of magnesium hydroxide after | | | Viscosity after 7 days(25°C.) × $10^3$ cp. |
|---|---|---|---|---|---|---|
| | | | 1 day | 3 days | 7 days | |
| 25.0 | 0 | Upper | 0.0 | 0.0 | 0.0 | <0.1 |
| | | Medium | 8.2 | 2.0 | 0.0 | <0.1 |
| | | Lower | 34.0 | 36.1 | 38.0 | 62.0 |
| 25.0 | 1.7 | Upper | 0.9 | 0.2 | 0.2 | <0.1 |
| | | Medium | 10.3 | 0.7 | 0.7 | <0.1 |
| | | Lower | 37.2 | 40.1 | 44.8 | 42.0 |
| 35.2 | 1.7 | Upper | 19.3 | 4.4 | 0.9 | <0.1 |
| | | Medium | 35.3 | 45.5 | 46.3 | 7.5 |
| | | Lower | 44.3 | 45.5 | 48.0 | 15.6 |
| 40.1 | 1.7 | Upper | 40.1 | 40.0 | 39.8 | 1.0 |
| | | Medium | 40.1 | 40.2 | 40.2 | 1.1 |
| | | Lower | 40.2 | 40.2 | 40.3 | 1.2 |
| 44.5 | 2.2 | Upper | 44.6 | 44.1 | 43.8 | 1.5 |
| | | Medium | 44.5 | 44.6 | 44.6 | 1.5 |
| | | Lower | 44.7 | 44.3 | 44.8 | 1.5 |
| 54.1 | 3.2 | Upper | 54.5 | 54.0 | 53.8 | 2.7 |
| | | Medium | 54.1 | 54.1 | 54.2 | 2.8 |
| | | Lower | 54.1 | 54.1 | 54.1 | 2.8 |
| 59.8 | 5.5 | Upper | 59.8 | 59.8 | 59.4 | 7.8 |
| | | Medium | 59.8 | 59.8 | 59.8 | 7.8 |
| | | Lower | 59.8 | 59.9 | 60.0 | 8.0 |

EXAMPLE 3

To a magnesium hydroxide cake at a solid concentration of 45 percent by weight was added an anionic surface active agent in a ratio 5 percent by weight based on the solid content of magnesium hydroxide. The mixture was agitated in a pestler for 5 minutes and the viscosity was measured. The results are shown in Table 2. Only sodium naphthalene sulfonate surface active agents were effective in slurry formation from the magnesium hydroxide cake.

Table 2

| Surface active agent | Viscosity(25°C.) × $10^3$ cp. |
|---|---|
| No addition | 62.5 |
| Sodium dodecyl benzene sulfonate | 56.4 |
| Sodium oleate soap | 57.2 |
| Potassium oleate soap | 51.7 |
| Sodium lauryl sulfate | 58.8 |
| Sodium isopropyl naphthalene sulfonate | 1.0 |
| Sodium butyl naphthalene sulfonate | 0.8 |
| Formalin condensate of sodium β-naphthalene sulfonate | 0.4 |

EXAMPLE 4

Figure 2:
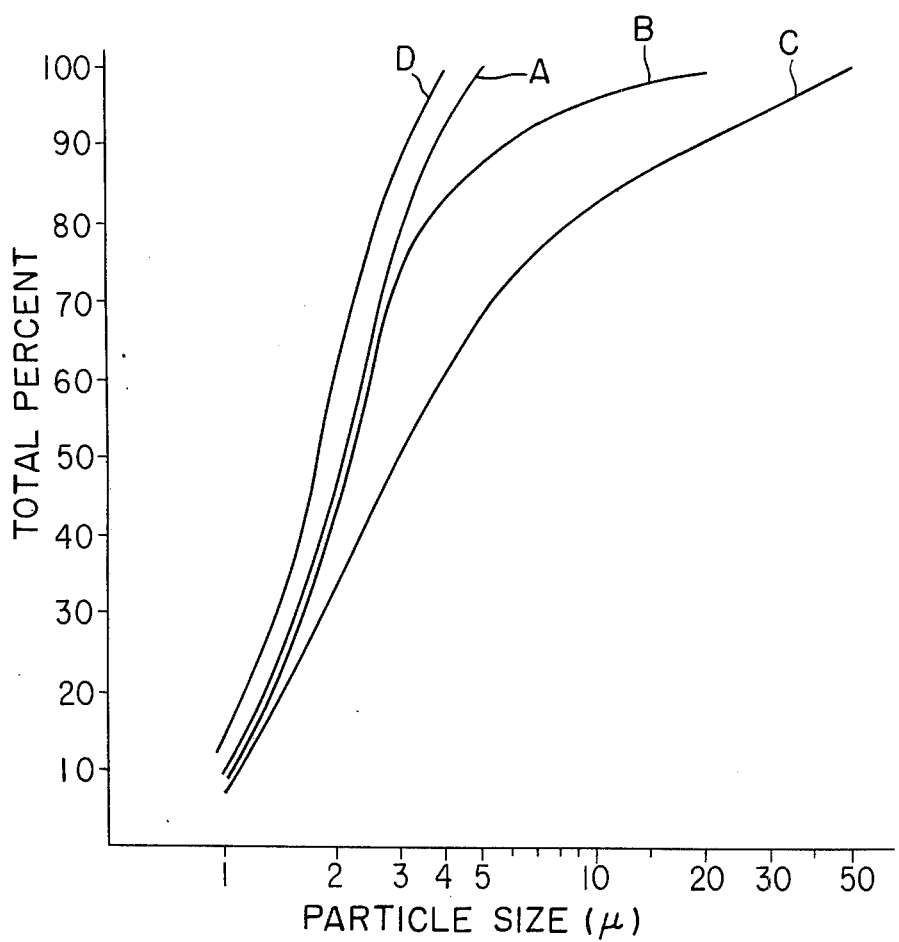
FIG. 2 shows particle size distribution of magnesium hydroxide wherein A, B, C and D respectively indicate the results with the samples A, B, C and D described in Example 3.

Four forms of magnesium hydroxide (A) slurry at 25 percent by weight with a viscosity of 1200 cp., (B) cake from concentration of A to a solid concentration of 45 percent by weight and filtration, (C) dry powders from drying of B at a temperature of 105°C. for 24 hours and pulverizing by a bantam mill manufactured by Hosokawa Iron Industries and (D) slurry after treatment with a homogenizer of the slurry formed from B by the addition of 2.2 percent of formalin condensate of sodium β-naphthalene sulfonate according to the invention were measured for the particle size distribution when diluted. The reactivity was inferred from ease of dilution and particle size. The results are shown in FIG. 2 wherein Ⓐ, Ⓑ, Ⓒ AND Ⓓ corresponding to (A), (B), (C) and (D) in the example, respectively.

Measurement of the particle size distribution was made as follows: Each of the four forms of magnesium hydroxide was diluted with ion-exchange water to a concentration of 0.2 percent by weight, followed by addition of 0.1 percent of sodium hexametaphosphate. The mixture was stirred for 30 minutes and measured using a light scanning particle size distribution analyzer (type PSA-II) manufactured by Hitachi, Ltd.

The results show that (C) has the smallest particle sizes followed by (A), (B) requires a long period of time for dilution and (D) is accompanied by aggregation of the particles by the drying procedures.

The aqueous suspensions of magnesium hydroxide according to the invention are valuable because they are low in viscosity at high concentrations and have high fluidity. They are conveniently handled by pumping the dilution. There is no difficulty with distance transportation because there is precipitate formation. The cost of transportation is low because of the high concentration.

What is claimed is:

1. Fluid aqueous suspensions of magnesium hydroxide having a solids content of from 35 to 60 percent by weight based on the total weight of a viscosity up to 10,000 cp. and containing at least about 0.5 percent by weight of a sodium naphthalene sulfonate based on the weight of magnesium hydroxide.

2. A suspension of claim 1 wherein said sodium naphthalene sulfonate surface active agent is selected from the group consisting of sodium alkyl naphthalene sulfonate and formalin condensates of sodium β-naphthalene sulfonates.

3. A suspension of claim 1 wherein the alkyl group of the sodium alkyl naphthalene sulfonate contains at least three carbon atoms.

4. A suspension of claim 1 wherein the average degree of condensation of the formalin condensates of sodium β-naphthalene sulfonate is about 10.

5. A suspension of claim 1 wherein the solids content is from 35 to 60 percent and the amount of added sodium naphthalene sulfonate is from about 1 to 8 percent.

6. A suspension according to claim 1 wherein the solids content is from 40 to 60 percent and the amount of added sodium naphthalene sulfonate is from 1.7 to 8 percent.

* * * * *